United States Patent [19]

Cobb, III

[11] Patent Number: 5,440,087
[45] Date of Patent: Aug. 8, 1995

[54] SWITCH SYSTEM FOR USE WITH MOTOR VEHICLE TRANSMISSIONS

[75] Inventor: Carleton M. Cobb, III, East Walpole, Mass.

[73] Assignee: Texas Instruments Incorporated, Dallas, Tex.

[21] Appl. No.: 176,753

[22] Filed: Jan. 3, 1994

[51] Int. Cl.⁶ .............................................. H01H 9/06
[52] U.S. Cl. ................... 200/61.88; 200/302.1
[58] Field of Search ............... 200/61.88, 61.91, 293, 200/302.1, 11 R–11 TW

[56] References Cited

U.S. PATENT DOCUMENTS

| | | | |
|---|---|---|---|
| 5,099,092 | 3/1992 | Lauritsen | 200/61.91 |
| 5,191,178 | 3/1993 | Baker | 200/61.88 |
| 5,231,254 | 7/1993 | Baker et al. | 200/61.91 |
| 5,338,907 | 8/1994 | Baker et al. | 200/61.88 |

*Primary Examiner*—J. R. Scott
*Attorney, Agent, or Firm*—Russell E. Baumann; Richard L. Donaldson; René E. Grossman

[57] ABSTRACT

An electric switch used with motor vehicle transmissions is shown in which the switch arm (22') is mounted on a manual shaft (30) to be movable therewith and is received in a housing (44) which has an end freely rotatable about the manual shaft and an opposite end coupled to the detent lever roller (16). Ingress of debris into the housing is prevented, in one embodiment, by annular sealing elements (54, 56) formed of resilient material and having a curved surface extending in a radial direction disposed around the manual shaft (30) on either side of the switch arm between the switch arm and the housing. In a second embodiment a single annular sealing element (56) is used on one side of the switch arm (22") and the switch arm (22") on its opposite side and the base (12") of the housing are formed with matching curved surfaces (27, 29). In another embodiment the switch arm (64) is fixedly mounted on the detent lever (42) through a depending leg (66) with housing (82) having an end rotatably mounted around the leg (66) with the opposite end of the housing coupled to the detent lever roller (16).

10 Claims, 4 Drawing Sheets

SWITCH SYSTEM FOR USE WITH MOTOR VEHICLE TRANSMISSIONS

FIELD OF THE INVENTION

This invention relates generally to vehicular transmissions and more particularly to electrical switches for providing an electrical signal responsive to the position of the detent lever of the vehicle.

BACKGROUND OF THE INVENTION

It is conventional to mount a rotary switch on the transmission housing externally thereof to receive mechanical gear selection inputs from the operator of a vehicle through various linkages and output gear selections to a decoder module and the transmission electronic control unit via electronic signals. The switch includes a quadrant with a selected number of electrical switch segments disposed thereon with each segment providing an output to the decoder module. The manual valve controlling hydraulic operation of the transmission is mechanically coupled to a plate having indexing detents, called a detent lever, mounted on a shaft and pivotably movable therewith. The shaft extends through the transmission housing wall and a switch bar is fixedly attached to the shaft externally of the transmission housing so that when a vehicle operator selects a gear the switch bar within the rotary switch moves across the quadrant to a predetermined position to engage one or more of the electrical contact segments. In certain systems the electronic control monitors the gear position along with other inputs relative to such things as throttle position, output shaft speed, engine speed, engine load and so on.

In copending application Ser. No. 07/978,603, now U.S. Pat. No. 5,338,907, assigned to the assignee of the present invention, a switch system is disclosed which is mounted within the transmission housing in order to avoid placing the switches in a hostile environment subject to water splash and the like as well as to avoid tolerance stack-up problems associated with linkages employed when mounting the switches externally of the transmission housing. In that application a switch housing is shown mounted on the manual lever shaft. The housing is coupled to the roller attached to the detent spring biasing the roller into engagement with the outer edge of the detent lever to maintain the housing stationary relative to the transmission housing. A switch arm fixedly mounted to the manual lever shaft mounts a plurality of first electrical contacts and extends into the switch housing. The switch arm, movable with the detent lever, moves into and out of engagement with respective second electrical contacts mounted on the switch housing. Annular seals are disposed between a hub of the switch arm and the switch housing to prevent ingress of metal particles and debris into the switch housing.

Switch systems made in accordance with application Ser. No. 07/978,603, now U.S. Pat. No. 5,338,907 are very effective in obviating the prior art hostile environment and stack-up problems; however, in certain vehicles the space available to place a switch system within the transmission housing, especially in the direction taken along the longitudinal axis of the manual lever shaft, i.e., in a vertical direction, is so limited that there is insufficient space for conventional seal mechanisms needed to prevent ingress of metal particles and other debris into the switch housing.

It is therefore an object of the invention to provide an electric switching assembly responsive to gear selection which is free of the limitations of the prior art mentioned above and which can be fitted within available space of existing vehicular transmission housings. Another object of the invention is the provision of a switch assembly having a rotary member with an improved mechanism which allows passage of fluid but prevents ingress of debris and which occupies minimal space, particularly in the vicinity of the manual lever shaft, yet which is reliable and has a long useful life.

Other objects, advantages and details of the switch system of this invention and seal mechanism therefore, appear in the following detailed description of preferred embodiments of the invention.

BRIEF SUMMARY OF THE INVENTION

Briefly, in accordance with a first embodiment of the invention, a switch housing is mounted on the manual lever shaft between the transmission housing and the detent lever of a vehicle. The switch housing is coupled with the detent roller to maintain the housing essentially stationary relative to the transmission housing while a switch arm fixedly mounted on the manual lever shaft, extends into the switch housing. A plurality of first electric contacts are mounted on the switch arm and are movable into and out of engagement with second electrical contacts mounted on the switch housing as the manual lever shaft and switch arm pivot. According to the first embodiment of the invention, annular elements of material having good spring characteristics, such as stainless steel, and having a curved configuration taken in the radial direction, are placed around the manual lever shaft on either side of a wall of the hub and between the switch arm and the housing providing virtually a zero clearance sliding joint preventing the passage of debris. In a second embodiment, a single annular element is used on one side of the hub wall while the other side of the hub wall and the housing are formed with matching curved surfaces extending in the radial direction to accommodate any rocking motion of the switch arm while still preventing passage of debris into the housing.

In accordance with another embodiment, the switch arm is fixedly mounted through a depending leg to the detent lever at a location intermediate the manual lever shaft and the outer periphery of the detent lever and the switch housing has one end coupled to the detent roller and an opposite end rotatably mounted about the leg. A conventional resilient annular seal member is placed around the pin within the switch housing with the switch arm biasing the seal member against the switch housing.

DESCRIPTION OF THE PREFERRED EMBODIMENTS

Figure 1:
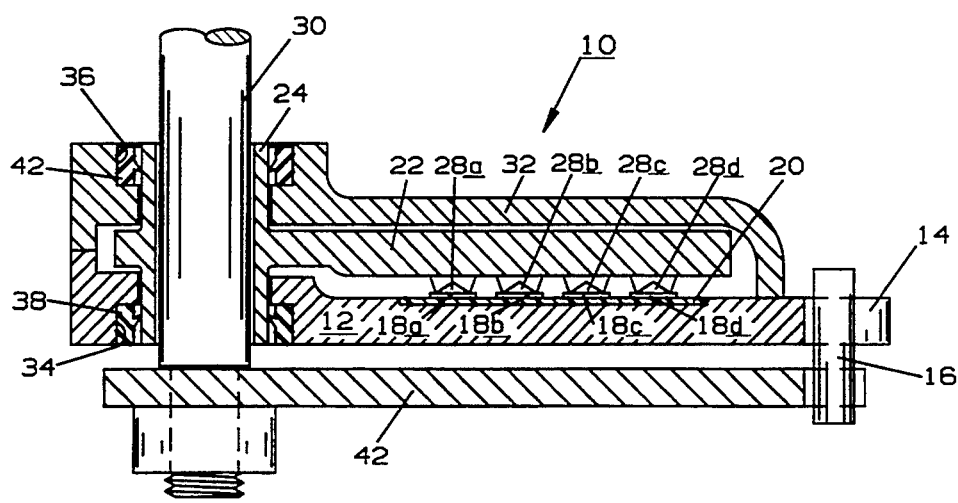
FIG. 1 is a cross sectional view of a switch housing as shown in Ser. No. 07/978,603, now U.S. Pat. No. 5,338,907.

Referring to the drawings, numeral 10 represents a switch system as disclosed in application Ser. No. 07/978,603, now U.S. Pat. No. 5,338,907, referenced above. Switch system 10 comprises a switch housing having a base plate 12 provided at a free end thereof with a bifurcation forming a slot 14 which receives a detent roller 16 therein. A plurality of arcuately extending stationary contacts 18a, 18b, 18c and 18d are disposed on a circuit board 20.

An elongated switch arm 22 extends from a hub portion 24 along the top surface of base plate 12 generally in parallel relation thereto. A plurality of second electrical contacts 28a, 28b, 28c and 28d, are mounted on the lower surface of arm 22, one for each of the stationary contacts and being aligned therewith. In order to limit movement of switch arm 22 to that of manual shaft 30, hub portion 24 is fixed to the shaft as by forming a pair of parallel flat surfaces 24a which mate with a corresponding pair of parallel flat surfaces 30a formed on manual shaft 30 so that switch arm 22 is keyed to shaft 30 fixing its angular orientation to that of the shaft and movable therewith.

A top switch housing cover 32 is received over and fixed to base plate 12. Base plate 12 and housing cover 32 are each provided with an annular seal seat 34, 36 respectively in a bore which receives hub 24 which in turn is received on manual shaft 30. Lip seal 38 is disposed in seat 34 and lip seal 40 is disposed in seat 36 to seal the switch housing from the ingress of metal particles and debris into the switch contact area.

Electrical contact members 28a-28d (see FIG. 2), are configured as elongated spring fingers biased downwardly so that they will engage base plate 12 when assembled in the switch housing. As manual shaft 30 is turned, contact fingers 28a-28d will wipe along the top surface of circuit board 20 on base plate 12 and will engage respective stationary contact traces 18a-18d at selected angular positions of shaft 30.

Figure 2:
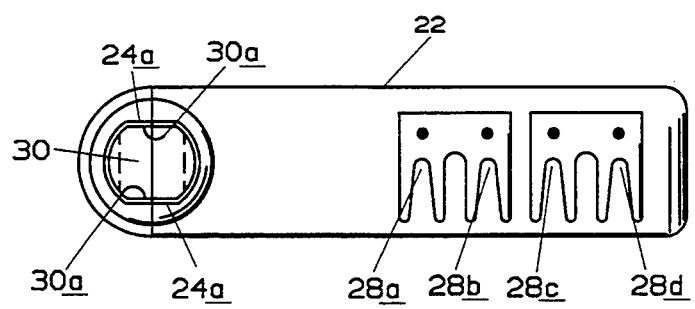
FIG. 2 is a bottom plan view of a movable switch arm used in the FIG. 1 switch housing.

The switch system of FIGS. 1 and 2 provides a sliding contact system which obviates prior art problems in which electrical contacts are subject to electrical shorting by conductive particles and slivers generated during normal operation of an automatic transmission. The system also provides an excellent reference to the mechanical system, i.e., the manual shaft 30 and detent spring (not shown) coupled to roller 16 which biases the roller into engagement with the outer peripheral edge of detent lever 42.

However, in certain vehicles the clearance between detent plate 42 and the transmission housing is insufficient to provide space required for seal mechanisms such as that shown in FIG. 1 comprising seal seats 34, 36 and lip seals 38, 40.

Figure 3:
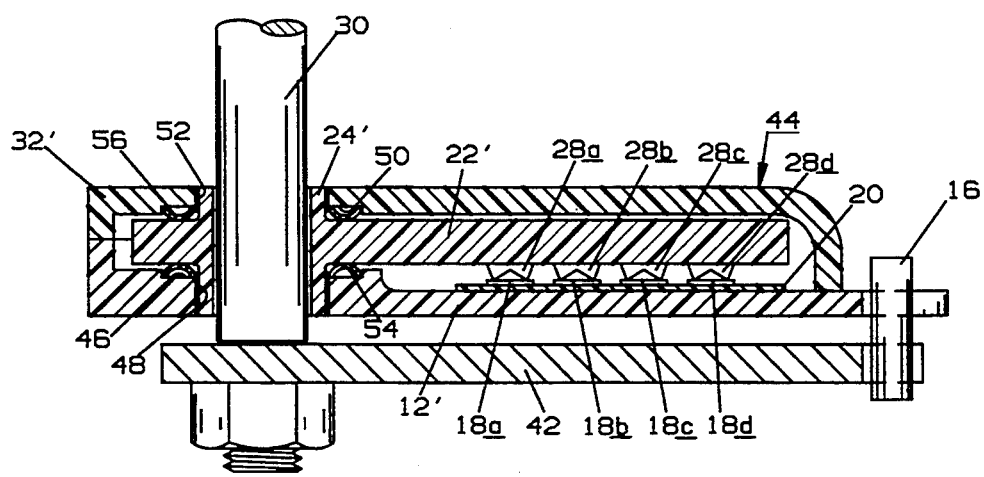
FIG. 3 is a cross sectional view, similar to FIG. 1, of a switch housing system made in accordance with a first embodiment of the invention.

A switch system made in accordance with the invention, shown if FIG. 3, utilizes seal apparatus which occupies virtually no vertical space. As seen in the Figure, switch arm 22' formed of any suitable material, such as synthetic resin, is similar to switch arm 22 of FIG. 1; however, hub 24' has a shorter dimension taken in the direction of the longitudinal axis of manual shaft 30, occupying no more space in the vertical direction, as seen in FIG. 3 than the switch portion of housing 44. With particular reference to FIG. 3b, a first annular seat 46 is formed in base plate 12', also formed of any suitable material such as synthetic resin, adjacent bore 48 and a second aligned seat 50 is formed in housing cover 32' adjacent bore 52. First and second annular seats 46, 50 respectively, are surface portions lying in respective planes which extend perpendicular to the longitudinal axis of manual shaft 30. A first annular seal element 54 is disposed on seat 46 and a second, similar annular seal element 56, is disposed on seat 50. Seal elements 54, 56 are formed of material having good spring characteristics such as stainless steel and are preformed having a smooth curved surface taken in a radial direction, as can be seen in FIG. 3a.

Figure 3A:
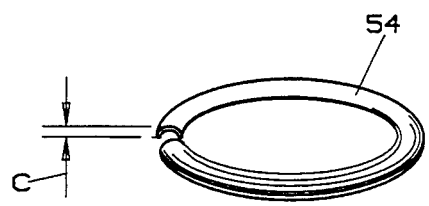
FIG. 3a is a perspective view partly broken away of a seal element used in the FIG. 3 embodiment.
Figure 3B:
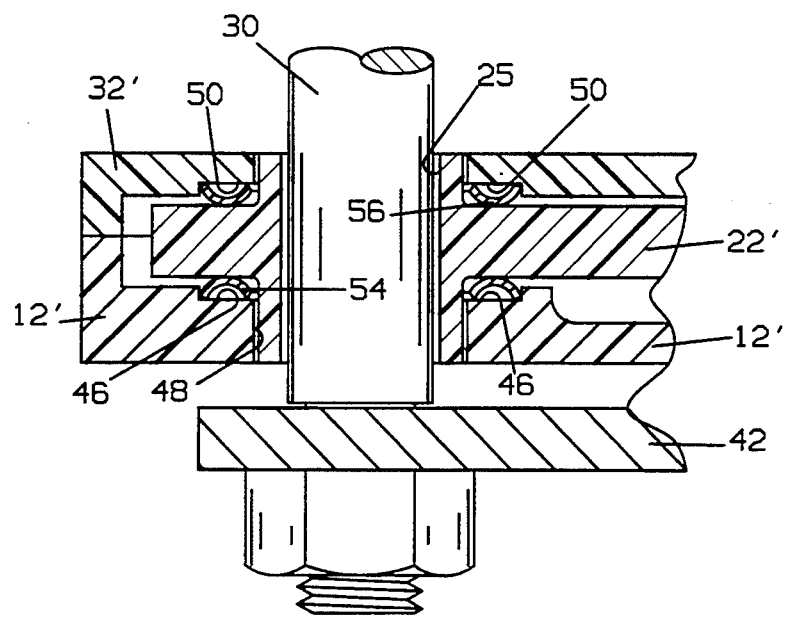
FIG. 3b is an enlarged portion of FIG. 3.

The curved surface portions have a selected crown height, that is, a height "c" shown in FIG. 3(a) between a plane in which edges of and inner peripheral edges of each element lies and that portion of the curved surface portion furthest removed from that plane. Annular elements 54, 56 are disposed on respective annular seats 46, 50 between switch arm 22' and base plate 12' and top housing cover 32' respectively at a distance less than crown height "c" so that the annular sealing elements will conform to the available space and effectively prevent passage of debris.

By way of example, a sealing element formed of material approximately 3 mils thick having a suitable curved surface would have a crown height of approximately 4.5 mils in the at rest configuration, that is, before being subjected to a load which would tend to flatten the element. The curved surfaces shown in FIGS. 3 and 3a are somewhat exaggerated for purposes of illustration. Once the seal elements are placed on their seats and housing cover 32' is attached to base plate 12' by any suitable manner, seal elements 54, 56 will be loaded and will essentially conform to the surface of the seat and aligned portions of the switch arm 22'. However, the shape of the seal element will conform to clearances caused by any rocking or tilting movement of switch arm 22' and therefore will prevent particles and debris in general from passing by the seal elements into the switching area. At the same time fluid can pass by the seal and serves to lubricate the sliding surfaces between the crown portion of the seal elements and switch arm 22'.

Although the crown portion of the seal elements 54 and 56 are shown in engagement with switch arm 22', it will be appreciated that the crown side could be reversed, if desired, so that the crown would be received on a respective seat 46, 50.

Figure 4:
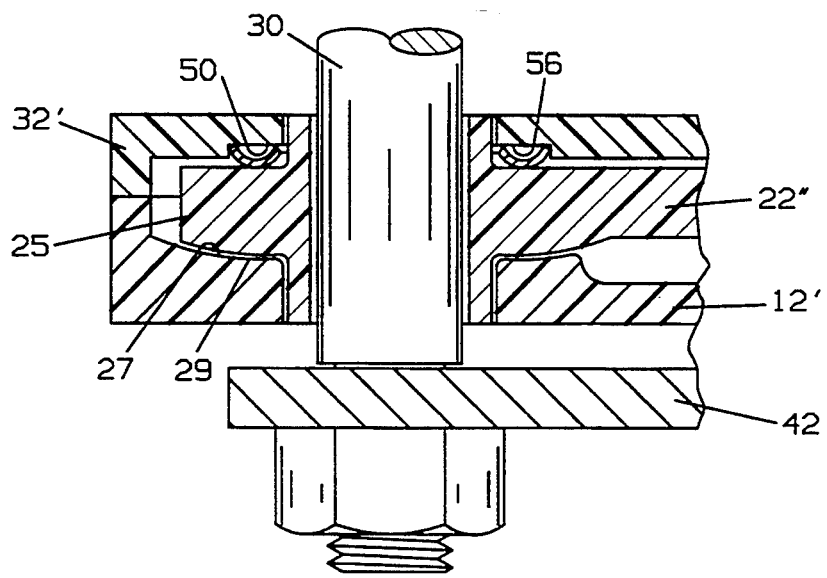
FIG. 4 is an enlarged fragmentary, cross sectional view of the seal arrangement of a second embodiment of the invention.

With reference to FIG. 4, a modified embodiment uses a single annular sealing element 56 on one side of wall 25 of switch arm 22" in cooperation with surface portions 27, 29 formed on the opposite side of wall 25 and base plate 12" respectively. Surface portions 27, 29 are formed with matching curved surface portions extending in a radial direction so that close physical engagement will be maintained between the switch arm 22" and the base plate even with a slight skewed motion while resilient sealing element 56 will conform to the space provided by such motion thereby effectively preventing the passage of debris.

Figure 5:
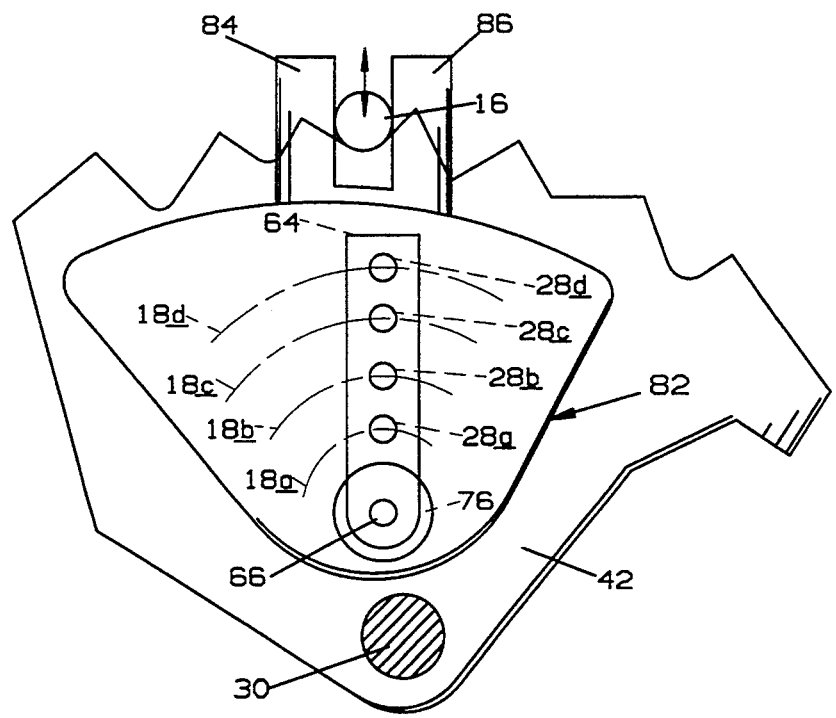
FIGS. 5 and 6 are top plan views of a switch housing system made in accordance with another embodiment of the invention and shown with a detent lever in two different positions.
Figure 6:
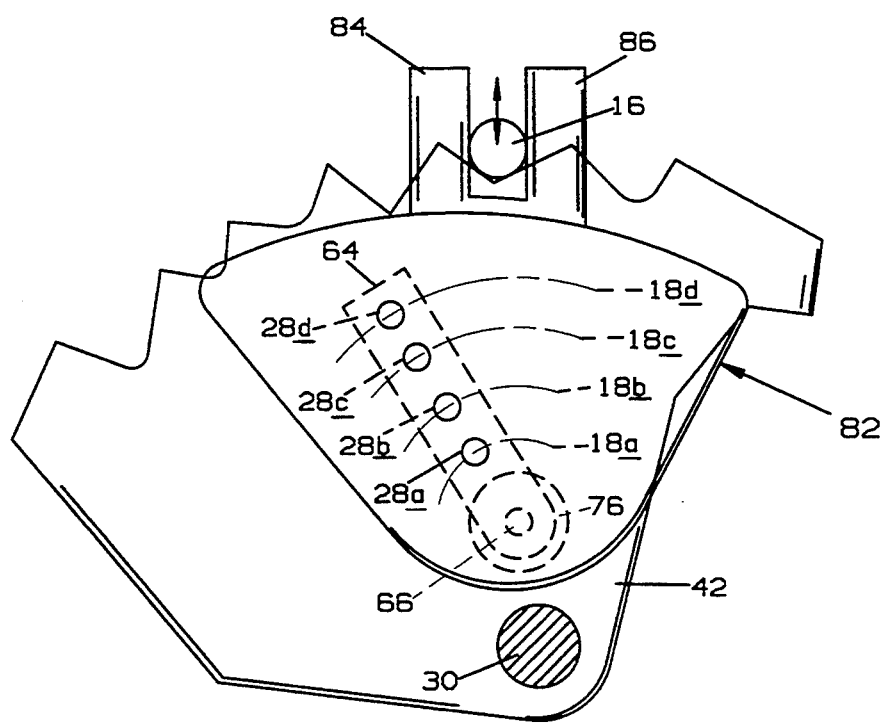
Figure 7:
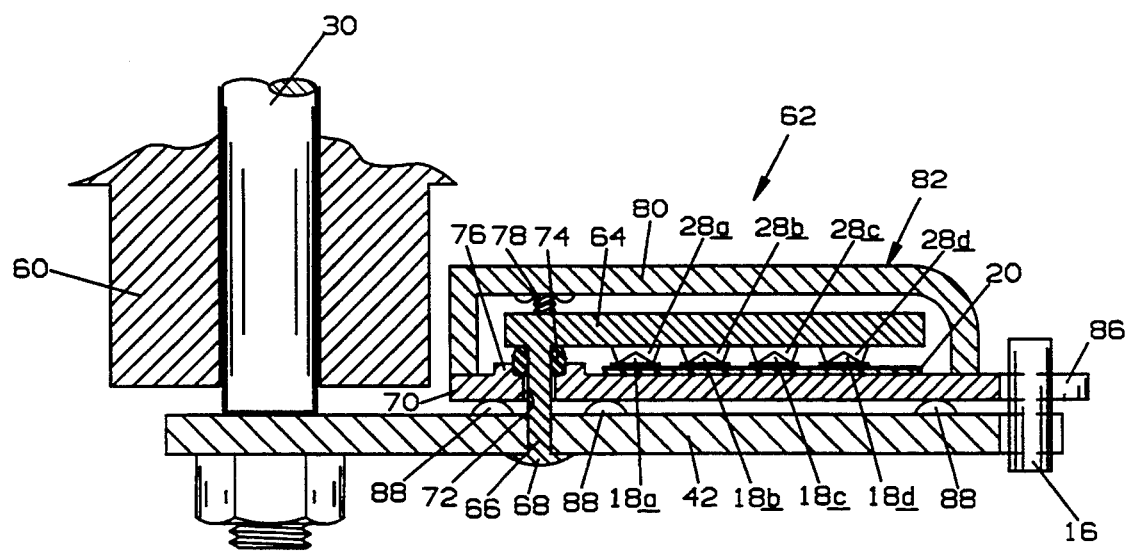
FIG. 7 is a cross sectional view of the FIGS. 5 and 6 switch housing system.

In certain vehicles the transmission housing in the immediate vicinity of manual shaft 30 may provide so little vertical clearance that there is insufficient space for a switch housing and sealing structure to be coupled to the shaft. The embodiment shown in FIGS. 5-7 provides a switch system useful in such vehicles in which the switch housing is mounted on detent lever 42 offset from manual shaft 30. As seen in FIG. 7, boss 60 is disposed so close to detent lever 42 that there is insufficient space between detent lever 42 and the boss to provide for any switch structure. In this embodiment, switch system 62 comprises a switch arm 64 which is fixedly mounted on detent lever 42 through depending leg 66, as by welding thereto as indicated at 68. Base plate 70 having circuit board 20 thereon and stationary contact traces 18a–18d is provided with a bore 72 which receives leg portion 66. A conventional resilient seal 74, such as an annular gasket, is received in a suitable seat formed by annular rib 76 around pin 66 to prevent ingress of debris into the switch area. If desired, a spring member 78 can be used to place a force on gasket 74 through top housing cover 80 which is fixed to base plate 70 in any conventional manner. As seen in FIGS. 5 and 6 as detent lever 42 is caused to pivot through manual shaft 30 housing 82 is caused to pivot about leg 66 by reacting with roller 16 through bifurcation legs 84, 86 extending from housing 82. If desired, low friction strips 88 of Teflon, a trademark of DuPont de Nemours and Co. for fluorocarbon polymer, or the like can be interposed between base plate 70 and detent lever 42 to facilitate sliding motion therebetween.

It should be understood that preferred embodiments have been described by way of illustrating the invention but that this invention includes various modifications and equivalents to the disclosed embodiments. It is intended that the invention include all modifications and equivalents of the disclosed embodiments falling within the scope of the appended claims.

What is claimed is:

1. A switch system for use with motor vehicle transmission apparatus having a pivotably mounted manual shaft mounted in a transmission housing and having a longitudinal axis and a detent lever with a plurality of detents on an outer edge surface thereof, each detent corresponding to a specific transmission gear selection, a roller movable toward and away from the manual shaft biased into engagement with the outer edge surface of the detent lever, the detent lever being mounted on the shaft so that the angular orientation of the detent lever is fixed relative to that of the shaft, the switch system comprising a switch housing mounted adjacent to the detent lever, the switch housing having two opposite ends, one end coupled to the roller to maintain the said one end of the housing in a fixed position relative to the transmission housing, the other end of the switch housing being pivotably mounted on the manual shaft, the switch housing having a base, a switch arm disposed within the housing fixedly mounted relative to the manual shaft so that the angular orientation of the switch arm relative to the manual shaft remains constant, at least a portion of the switch arm disposed in the switch housing being generally parallel to and spaced from the base, switch means mounted within the switch housing including at least one first electrical contact being mounted on one of the switch arm and the base and at least one spring biased second electrical contact being mounted on the other of the switch arm and base, one of the first and second electrical contact being slidable between respective contacts engaged and contacts disengaged positions with the other electrical contact as the manual shaft and switch arm are pivoted, means to prevent ingress of debris into the switch housing wherein the switch arm and the switch housing have aligned annular surface portions extending around the manual shaft, each annular surface portion lying in a plane perpendicular to the longitudinal axis of the manual shaft and an annular sealing element having outer and inner peripheral edges formed of resilient material having a curved surface portion extending in a radial direction, the curved surface portion having a selected crown height between a plane in which the sealing element lies and that portion of the curved surface portion furthest removed from the plane, the annular sealing element disposed between the annular surface portions of the switch arm and switch housing, the annular surface portion being spaced from one another a distance less than the selected crown height and means for electrically energizing the switch and for outputting a signal therefrom corresponding to the respective contacts engaged and disengaged positions.

2. A switch system according to claim 1 in which the switch housing and the switch arm are formed of synthetic resin and the annular sealing element is formed of stainless steel.

3. A switch system according to claim 1 in which the switch arm and the switch housing have second aligned annular surface portions extending around the manual shaft having matching curved surfaces extending in a radial direction.

4. A switch system according to claim 1 in which the switch arm and the switch housing have second aligned annular surface portions extending around the manual shaft and a second annular sealing element formed of resilient material is disposed between the second aligned annular surface portions, the second annular sealing element having a curved surface portion extending in a radial direction, the curved surface portion having a selected crown height between a second plane in which the second sealing element lies and that portion of the curved surface furthest removed from the second plane, the second annular surface portions being spaced from one another a distance less than the selected crown height.

5. Apparatus for preventing ingress of debris into a housing comprising a housing having a wall with a bore extending through the wall, a pivotable shaft having a longitudinal axis received through the bore, a hub received on the shaft, the hub having a radially extending wall, the wall of the housing and the radially extending wall of the hub having aligned annular surface portions extending around the shaft, each annular surface portion lying in a plane perpendicular to the longitudinal axis and an annular sealing element having outer and inner peripheral edges formed of resilient material having a curved surface portion extending in a radial direction, the curved surface portion having a selected crown height between a plane in which the annular sealing element lies and that portion of the curved surface portion furthest removed from the plane, the annular sealing element disposed between the annular surface portions, the annular surface portions being spaced from one another a distance less than the selected crown height.

6. Apparatus according to claim 5 in which the housing and the hub are formed of synthetic resin and the annular sealing element is formed of stainless steel.

7. Apparatus according to claim 5 in which the housing and the hub have second aligned annular surface portions extending around the shaft, the second annular surface portions having matched curved surfaces extending in a radial direction.

8. Apparatus according to claim 5 in which the housing and the hub have second aligned annular surface portions extending around the shaft and a second annular sealing element formed of resilient material having a curved surface portion extending in a radial direction is disposed between the second aligned annular surface portions, the curved surface portion having a selected crown height between a second plane in which the second sealing element lies and that portion of the curved surface furthest removed from the second plane, the second annular surface portions being spaced from one another a distance less than the selected crown height.

9. A switch system for use with motor vehicle transmission apparatus having a pivotably mounted manual shaft mounted in a transmission housing and a detent lever with a plurality of detents on an outer edge surface thereof, each detent corresponding to a specific transmission gear selection, a roller movable toward and away from the manual shaft biased toward the outer edge surface of the detent lever, the detent lever being mounted on the shaft so that the angular orientation of the detent lever is fixed relative to that of the shaft, the switch system comprising a switch housing having first and second opposite ends mounted adjacent to the detent lever, the switch housing having the first end coupled to the roller to maintain the first end of the housing in a fixed position relative to the transmission housing, the switch housing having a base, a bore provided in the base, a switch arm having a portion disposed within the housing, the switch arm having a leg extending through the bore in the base fixedly mounted to the detent lever so that the angular orientation of the switch arm relative to the manual shaft remains constant, the switch arm portion disposed in the switch housing being generally parallel to and spaced from the base, switch means mounted within the switch housing including at least one first electrical contact being mounted on one of the switch arm and the base and at least one spring biased second electrical contact being mounted on the other of the switch arm and base, one of the first and second electrical contacts being slidable between respective contacts engaged and contacts disengaged positions with the other electrical contact as the manual shaft and switch arm are pivoted, means to seal the switch housing and means for electrically energizing the switch and for outputting a signal therefrom corresponding to the respective contacts engaged and disengaged positions.

10. A switch system according to claim 9 in which the means to seal comprises an annular gasket of flexible material disposed around the leg and further comprising a spring disposed between a top wall of the switch housing and the switch arm to place a compressive bias on the gasket.

* * * * *